Figure 2:
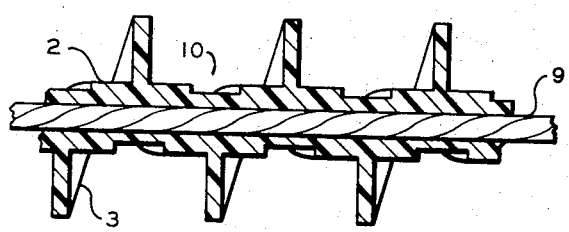

Dec. 26, 1967   R. G. VOSS   3,360,108
FLEXIBLE CONVEYING APPARATUS
Filed Aug. 29, 1966

INVENTOR
R. G. VOSS
BY

ATTORNEYS

United States Patent Office 3,360,108
Patented Dec. 26, 1967

3,360,108
FLEXIBLE CONVEYING APPARATUS
Raymond G. Voss, Bartlesville, Okla., assignor to Phillips Petroleum Company, a corporation of Delaware
Filed Aug. 29, 1966, Ser. No. 575,876
1 Claim. (Cl. 198—213)

This invention relates to a flexible conveying apparatus.

In another aspect, the invention relates to a conveying apparatus comprising a casing and a shaft having means attached thereto made of flexible thermoplastic material and adapted to fit within, and convey material through, the casing.

In another aspect, the invention relates to the conveying apparatus described above further characterized in that the casing and/or the shaft are made of flexible material, preferably flexible, thermoplastic material.

In still another aspect, the invention relates to a conveying apparatus comprising a casing and a shaft having a continuous, helical strip attached thereto made of flexible, thermoplastic material, and adapted to fit within, and to convey material through, the casing.

Conveying apparatus heretofore available have proved unsuitable for situations requiring conveyance around a corner or other obstruction. It is an object of this invention to provide a light weight, flexible conveying apparatus suitable for moving materials around corners or other obstructions. Another object of the invention is to provide a conveying apparatus suitable for unloading boxcars, grain elevators, and other similarly inaccessible storage areas. Still another object of the invention is to provide a flexible conveying apparatus suitable for conveying grain, animal feeds, and other pulverulent or particulate materials.

Other aspects, objects and the several advantages of the invention will be apparent to one skilled in the art upon reading the specification, appended claims and drawing.

In accordance with the practice of this invention, conveying apparatus is provided which comprises a casing and a shaft having means attached thereto made of flexible, thermoplastic material, said shaft and means being adapted to fit within said casing and to convey material through said casing.

The casing can be flexible or non-flexible, and can be made of any suitable material or combination of materials. Preferably, the casing will be pipe made of thermoplastic material or flexible tubing with a smooth liner. Suitable materials are, for example, acetal resins, acrylic resins, chlorinated polyethers, fluorocarbons, polyamides, polyolefins, polystyrene, vinyl polymers and copolymers, polyvinylidene halides, urethane elastomers, etc. Natural and synthetic rubbers are also suitable. Synthetic rubbers include homopolymers and copolymers of conjugated dienes, such as butadiene and isoprene, prepared by solution or emulsion polymerization. Homopolymers include cis-polybutadiene, trans-polybutadiene, and cis-polyisoprene. Copolymers include random and block copolymers; for example, copolymers of conjugated dienes with vinyl-substituted aromatic compounds, such as styrene. Metal casing may also be used.

As with the casing, the shaft may be flexible or non-flexible, and can be made of one or more suitable materials. For example, as shown in the drawing, the shaft can comprise the core made of one material, and an outer coating of another material. Suitable materials include metals, thermoplastics, and so on. Some examples are: flexible steel shafting, either the wire line type or the coiled-wire type having a hollow center; solid shafting of steel, brass, or other metal; or combinations such as coiled-wire type flexible shafting with plastic or rubber covering.

As indicated above, means attached to the shaft and adapted to convey material through the casing surrounding the shaft, can be made of a flexible, thermoplastic material or materials. In general, the thermoplastic material must be flexible, but should be sufficiently rigid to convey material through the casing. Thermoplastics are especially suited to use as such means because of their low friction characteristics which make them suitable to move various materials through screw conveyors. Examples of such materials are: acetal resins, acrylic resins, chlorinated polyether, fluorocarbons, polyamides, polyolefins, polystyrene, vinyl polymers and copolymers, polyvinylidene halides, urethane elastomers, natural rubber and synthetic rubber. Synthetic rubbers include homopolymers and copolymers of conjugated dienes such as butadiene and isoprene, prepared by solution or emulsion polymerization. Homopolymers include cis-polybutadiene, trans-polybutadiene and cis-polyisoprene. Copolymers include random and block copolymers; for example, copolymers of conjugated dienes with vinyl-substituted aromatic compounds, such as styrene.

The structure of the shaft and means attached thereto can be varied in relation to the kinds of material conveyed, the desired speed of conveyance, the texture of the material conveyed, etc. Preferably, said means will be a continuous, helical strip of constant dimensions. However the means can be continuous, helical strips having notches therein, or can be a series of paddles mounted at any desired angle, or can be a continuous, helical strip with paddles between the flights thereof. Further, the helical strip can be attached to, and spaced from, the shaft when the material being conveyed is sticky, gummy or viscous. It should be understood that the pitch of the helical strip and/or the number of paddles per unit length of shaft can be varied as desired.

Continuous helical strips can be made by extruding flexible, thermoplastic material from helically cut die into the helical shape, and then attached to the shaft, or can be extruded as a straight strip, and then wrapped around the shaft and attached thereto. In one embodiment, for example, the strip is extruded with a T-shaped profile, and then attached to the shaft at the top of the T-section, that is, at the top of the T. A helical continuous extrusion can be extruded directly onto the shaft by running the shaft through an offset helical die.

Figure 1:
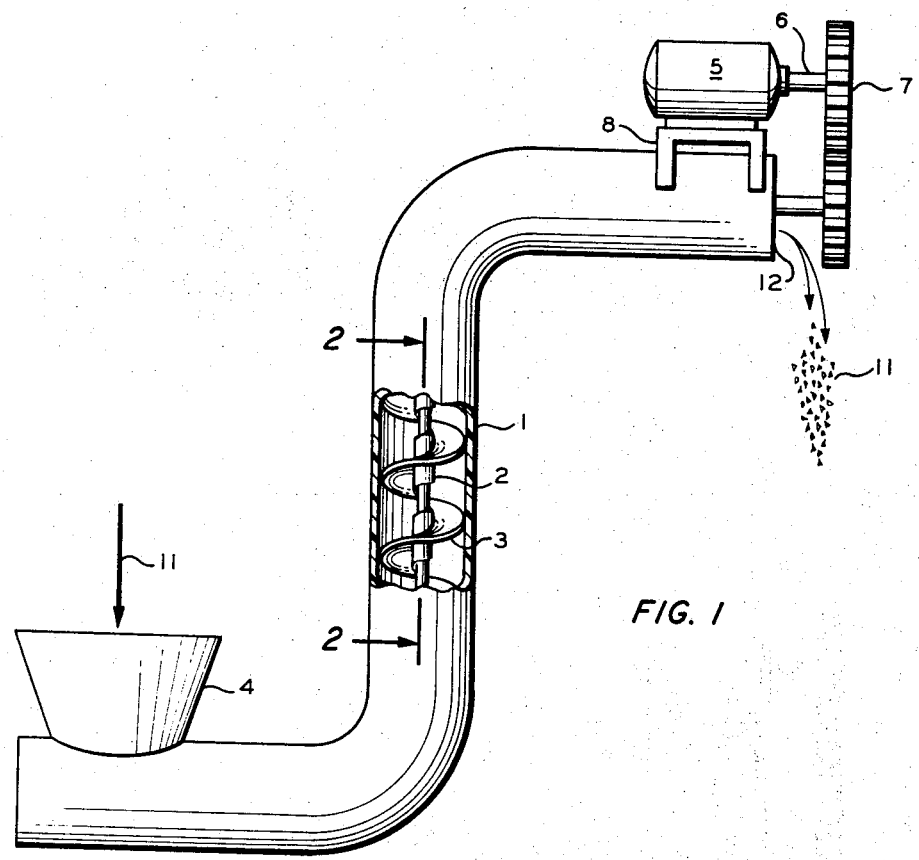

The drawings illustrate one embodiment of the apparatus of this invention. FIGURE 1 shows the apparatus in operation; and FIGURE 2 shows a cross-sectional view of the shaft and conveying means attached thereto.

In FIGURE 1, casing 1, which can be rigid or flexible, contains therein a shaft 2, which can also be rigid or flexible, and, attached thereto, a continuous, helical strip of flexible, thermoplastic material 3.

In operation, pulverulent material 11 enters casing 1 through, for example, a hopper, the outline of which is designated by 4. Rotation of shaft 2 and conveying means 3 carries material 11 through the casing 1, and it exits from casing 1 at 12. Motor 5, which is mounted on casing 1 by means of 8, drives shaft 6 which is connected to shaft 2 by means of gear train 7.

FIGURE 2, which is a cross-section of the shaft and conveying means taken along line 2—2, shows that shaft 2 has a core comprising a flexible cable 9, and that the shaft has a section 10 of smaller cross-section at which point the shaft can readily be bent to facilitate conveyance of material around a corner or other obstruction.

*Example*

A flexible conveying apparatus according to the invention was built having a shaft or core of helically coiled spring steel wire. A straight polyethylene section was wrapped helically around the shaft or core and ends of helical section were secured by binding in place wtih wire. The casing was made of ¾" solid wall metallic tubing sections joined by sections of flexible elastomeric tubing. Shaft was operated at various speeds up to 900 r.p.m. and conveying apparatus successfully conveyed polyethylene fluff, coffee grounds, sugar, flour, etc., through the straight metallic tubing sections and through the curved flexible elastomeric tubing sections. Material was conveyed horizontally at various upward slopes, and vertically. Curved flexible elastomeric tubing sections were bent at various angles, some of which approached 180 degrees, at a radius of about 6 inches.

Reasonable modification and variation are possible within the spirit and scope of this invention, the essence of which is a conveying apparatus comprising a casing and a shaft having means attached thereto made of flexible, thermoplastic material, and adapted to fit within the casing and to convey material therethrough.

I claim:
A flexible conveying apparatus comprising
(a) a flexible cylindrical casing of substantially constant internal diameter,
(b) a continuous flexible helical conveyor flight within said casing mounted on a flexible driving axle, said axle being substantially aligned with the axis of said casing and the diameter of said flight being substantially equal to the diameter of said casing,
(c) said helical flight further comprising a continuous flexible integral reinforcing flange along one side thereof, the face of said flange opposite said flight being fixedly attached to said axle and the width of said flange being less than the axial spacing of said helical flight, there being a continuous helical portion of said axle not covered by said flange whereby the flexibility of said axle and said flights are uninhibited.

References Cited

UNITED STATES PATENTS

| | | | |
|---|---|---|---|
| 915,702 | 3/1909 | Schroer | 198—213 X |
| 2,045,757 | 6/1936 | Constantin | 198—213 |
| 2,888,128 | 5/1959 | Allen | 198—213 X |
| 2,954,261 | 9/1960 | Taupin | 198—213 X |
| 3,064,830 | 11/1962 | Reed | 198—213 X |

HUGO O. SCHULZ, *Primary Examiner.*

EVON C. BLUNK, *Examiner.*

R. J. HICKEY, *Assistant Examiner.*